UNITED STATES PATENT OFFICE.

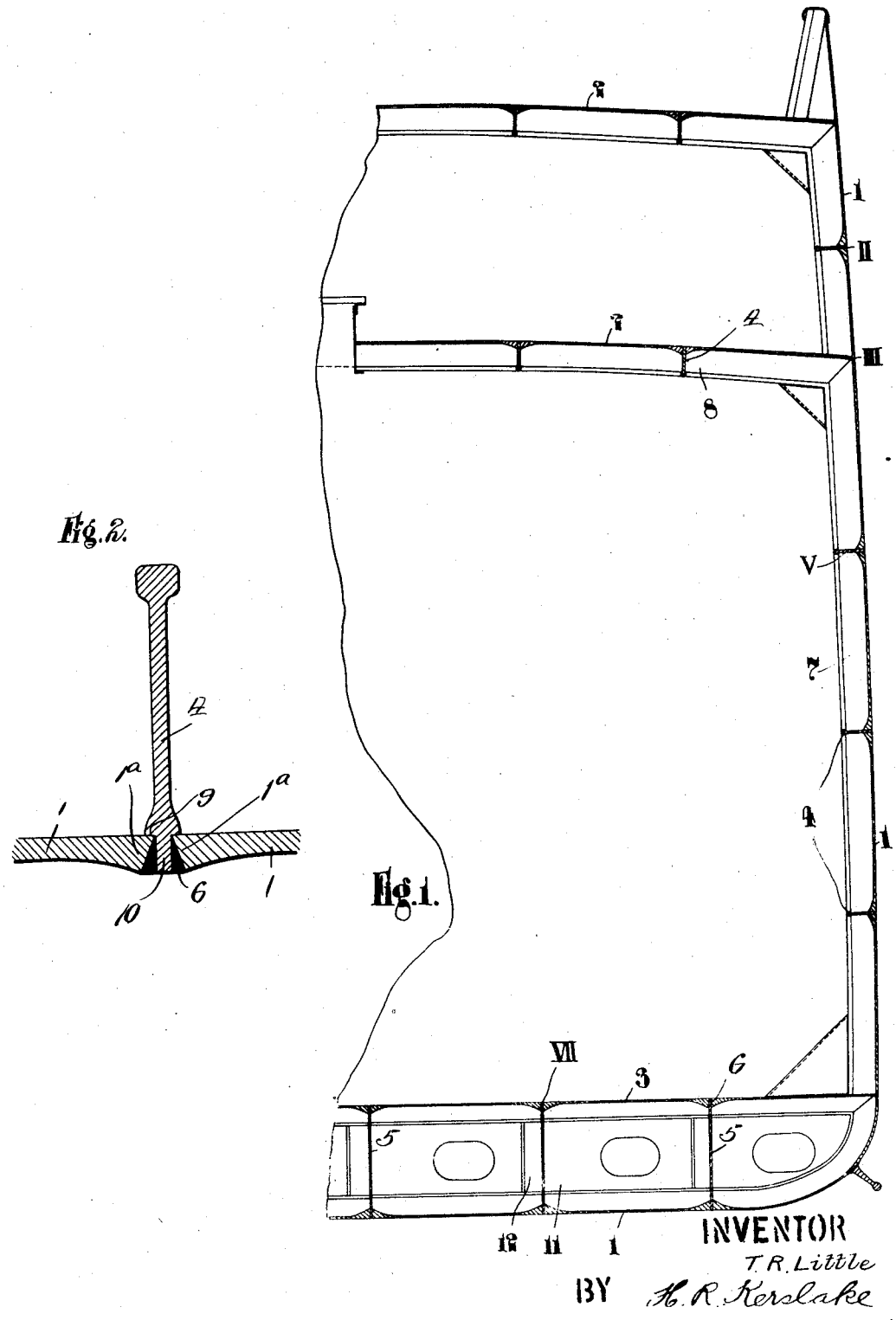

THOMAS ROYAL LITTLE, OF LIVERPOOL, ENGLAND.

STEEL OR IRON STRUCTURAL WORK.

1,328,841.  Specification of Letters Patent.  Patented Jan. 27, 1920.

Application filed September 5, 1918. Serial No. 252,718.

*To all whom it may concern:*

Be it known that I, THOMAS ROYAL LITTLE, a subject of the King of Great Britain and Ireland, residing at 633 Liver Buildings, Liverpool, in the county of Lancaster, England, have invented certain new and useful Improvements in and Relating to Steel or Iron Structural Work, of which the following is a specification.

This invention relates to steel or iron structural work, and has for its object to provide improvements in making the necessary connections between the elements of such structural work by welding.

The object of the invention is more particularly to provide improvements in iron and steel ship-building by substituting welding for riveting in making the necessary connections between the plates forming the shell and the longitudinal and/or transverse frames, and for connecting up the decks, stringers, bilges, tanks and the like.

Broadly, the invention consists in thickening the members which are connected together near the points at which welded connection is made in order to compensate for the diminution in strength of the material at such points of connection and by so placing the material being welded as to insure a strong connection at the weld and a more homogeneous structure.

Thus, for instance, in accordance with the invention the edges of plates are preferably thickened where a joint is to be made to such an extent that the strength of the combination produced by welding together the plates is not less than would be the strength of a similar member formed by rolling, pressing or like operations, that is to say, a homogeneous structure.

In the construction of a vessel or like structure comprising a framework and a skin or plating covering the framework, the plates may be provided with a thickened portion where they are connected with the members constituting the frame. Instead of, or in addition to providing the plates with such a thickened portion, the members constituting the frame may be provided with a thickened portion where they contact with the skin.

These members may be provided with a thickened portion in the manner referred to and also with a spigot or tongue portion which will extend between the edges of the plates, the thickened portion constituting shoulders or landings against which the inner surfaces of the plates will bear.

The method of construction involving the employment of frame members provided with spigot or tongue portions, or of ordinary sections or members (unthickened) which will pass through the plating, and with shoulders or landings with which the plates will contact (the weld being made between the edges of the plates and the spigot or tongue portion) will facilitate the welding and also provide a stronger construction than would be obtained by welding the landings of the plates together and welding the frame to the plates.

For effecting the necessary temporary connection between the members to be welded, holes may be provided in them for the accommodation of service bolts; thus holes may be provided in the webs of the frame members for the accommodation of the hooks of service bolts and plate washers may be used in connection with these bolts for holding the plates in position.

When using plates with thickened landings formed on them by rolling or other operations, the plates may be placed in position so that the edge of the web of the bulb or other section constituting a transverse or longitudinal frame member is flush with the face of the plate, the thickened edges or landings of which are then welded to the sides of the web.

Preferably, the plates of which the shell and deck are formed are arranged longitudinally so that the thickened landings do not offer the degree of resistance to propulsion which a vertical arrangement of the plates would do.

When, however, the plates are arranged so that the thickened portion extends inwardly and the plates present a smooth outward surface, there is no objection to the vertical arrangement of the plates on the ground of resistance to propulsion.

The intermediate transverse or longitudinal frame members may be formed with webs which are thickened at that portion which will be adjacent to the plating, and connection between these members and the plating will be made between the edge of the member and the surface of the plate.

In constructing the bottom of a vessel in accordance with the invention, the keelson may be of any suitable section and is preferably provided with longitudinal fillets or stops against which the plating forming the inner and outer bottom of the vessel bears, the plates being welded at their edges to the portion of the keelson lying between the adjacent edges of the plates.

In the construction of the bottom also the plates employed have preferably thickened edges or landings.

As will be understood, the invention is not confined to structures in which all the connections usually made by riveting are effected by welding.

The invention is illustrated by way of example in the accompanying drawings in which:

Figure 1 is a part cross-section amidships of a vessel;

Fig. 2 illustrates a method of securing the frame members provided with a spigot or tongue portion to the skin plating or shell.

In the drawings there is illustrated a vessel including generally shell plating 1, deck plating 2 and tank plating 3, bulb sections generally designated 4 being arranged between the side shell plating and transverse plating and deck framing, while keelsons 5 are arranged between the tank plating and the shell plating, the bulb sections 4 and keelsons 5 being welded to the adjacent portions as indicated at 6, the transverse framing and the deck framing against which the bulbs of the bulb sections 4 abut being indicated respectively by the numerals 7 and 8.

As shown in detail in Fig. 2 the plating sections 1 are thickened as at 1ᵃ at the edges of the adjacent sections while the bulb section 4 has its outer end provided with thickened portions or landings 9 and with a tongue or spigot portion 10 which extends between the edges of the plates 1—1 at which point it is welded as clearly shown at 6.

For effecting temporary connection between the members to be welded, holes may be provided in the members or plates and adapted to receive the shanks of hook bolts (not shown) while suitable means such as nuts (not shown) may be engaged on the bolts for holding the bolts in the desired position. The weld may then be effected so as to form an autogenous connection between the edges of plates and the tongue portion of the bulb section.

As employed in the claim the expression "steel" includes wrought iron, and the expression "ship" includes any form of water craft.

Having now described my invention, what I claim as new and desire to secure by Letters Patent is:—

A steel ship or other steel structure comprising plating elements thickened at their edges, frame elements having landings on either side and a spigot portion adapted to extend between the adjacent thickened edges of the plating elements and welded connections between the plating elements and the frame elements where the thickened portions of the former abut against the spigot portions of the latter.

In testimony whereof I have signed my name to this specification.

THOMAS ROYAL LITTLE.